Figure 1:
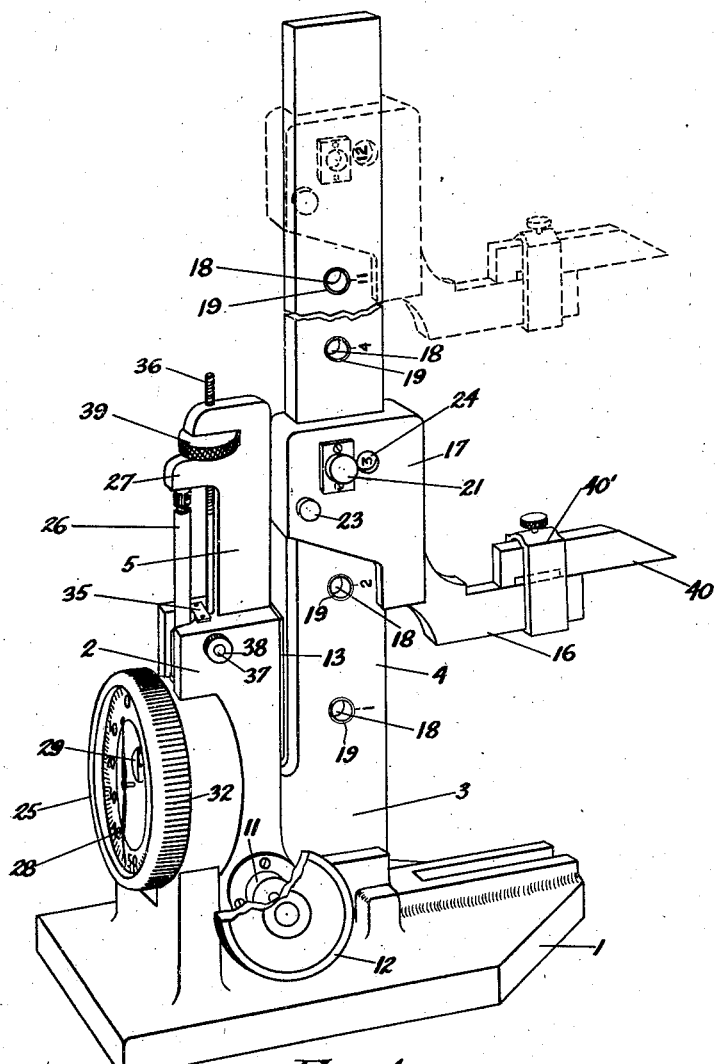

Oct. 28, 1947.  J. V. CAVICCHI  2,429,923
PRECISION HEIGHT GAGE
Filed Feb. 22, 1943  4 Sheets-Sheet 1

Inventor
Joseph V. Cavicchi
by
Otto K. H. Knopf
Attorney

Oct. 28, 1947.    J. V. CAVICCHI    2,429,923
PRECISION HEIGHT GAGE
Filed Feb. 22, 1943    4 Sheets-Sheet 2
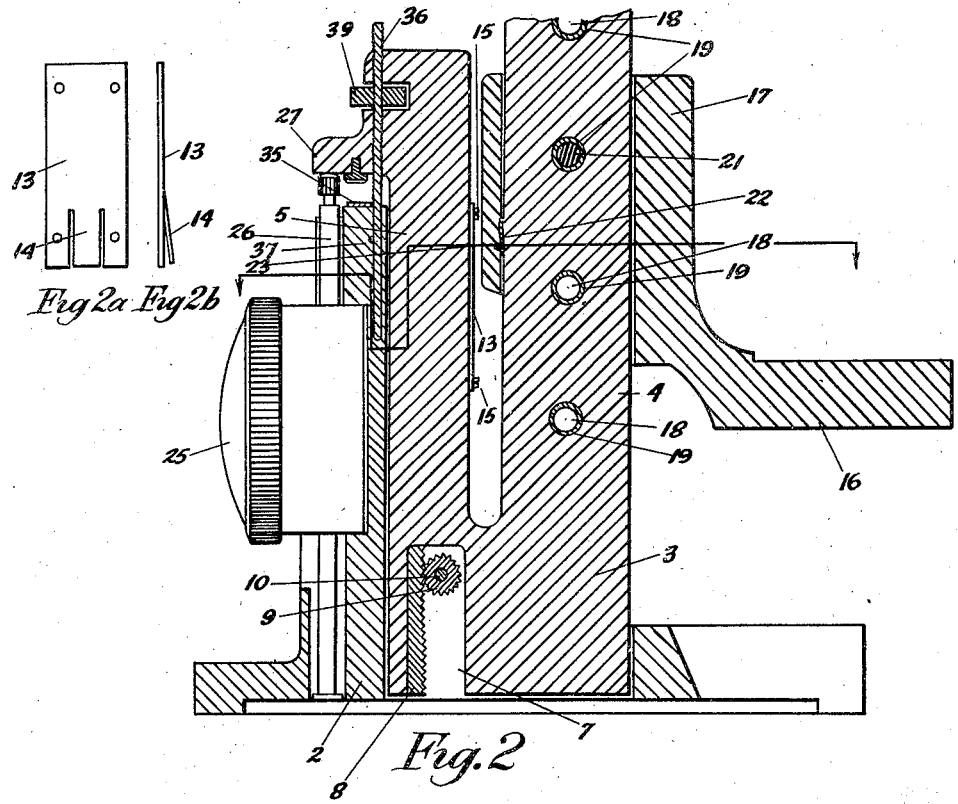
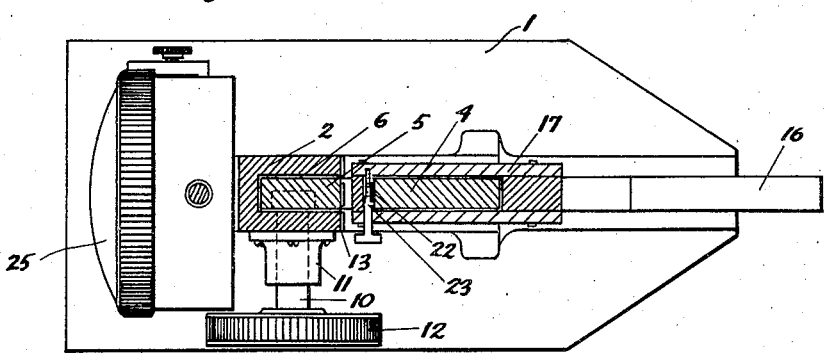
Inventor
Joseph V. Cavicchi Oct. 28, 1947. J. V. CAVICCHI 2,429,923
PRECISION HEIGHT GAGE
Filed Feb. 22, 1943 4 Sheets-Sheet 3

Inventor
Joseph V. Cavicchi by
Otto R. H. Kroff
Attorney

Inventor
Joseph V. Cavicchi

Patented Oct. 28, 1947

2,429,923

UNITED STATES PATENT OFFICE 2,429,923

PRECISION HEIGHT GAGE

Joseph V. Cavicchi, East Boston, Mass.

Application February 22, 1943, Serial No. 476,716

19 Claims. (Cl. 33—172)

The present invention relates to machinists' precision height and comparator gages.

Height gages have been in use for many years. The customary form of height gage requires a vernier scale arrangement in order to obtain measurements of the order of one-thousandth of an inch. Such vernier height gages are however, difficult to read accurately, especially under adverse conditions which often exist, such as poor light, poor eyesight, metal glare, rust stains or instrument wear. In such cases time is lost and the readings obtained are not dependable. Moreover, in order to read the vernier, it is nearly always necessary to pick up the instrument, which involves a possibility of disturbing the position of the vernier and consequent error in the measurement.

Heretofore, a few proposals have been made to provide a height gage which would be easier to read than the customary vernier type. These proposals have in some cases involved the use of dial type indicators of the kind generally in use by machinists for other measurement purposes, or of micrometers, also well known to machinists. The latter are usually quite rugged in construction, while the dial indicators are very easy to read, even in dim light. In the case of both of these types of prior art proposals, however, the resultant height gages have lacked the characteristics necessary to make them acceptable to tool and die makers, precision machinists, or inspection departments.

It is an object of the present invention to make available to the tool and die maker and precision machinist a height gage which is practical, fool proof and easily read without error.

It is a further object of the invention to provide a height gage which does not involve a vernier scale for measurements in thousandths of an inch and which therefore, eliminates the common twenty-five thousandths of an inch error obtained by misreading the customary vernier scale.

It is a further object of the invention to provide a height gage which is simple enough to be readily understood and accurately used by the novice.

A further object of the invention is the provision of a height gage which has a continuous range from zero to a maximum.

A still further object of the invention is the provision of a height gage having dial indicator or micrometer measuring instruments mounted in the base of the gage whereby great stability as well as a practical rugged construction are obtained.

Figure 6:
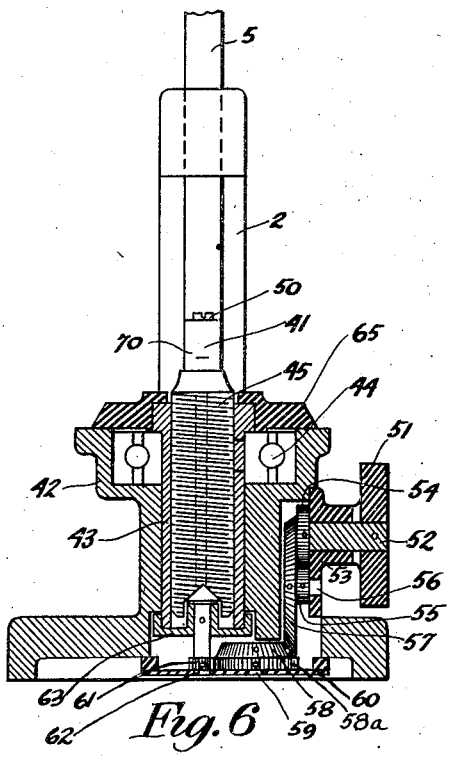
Figure 4:
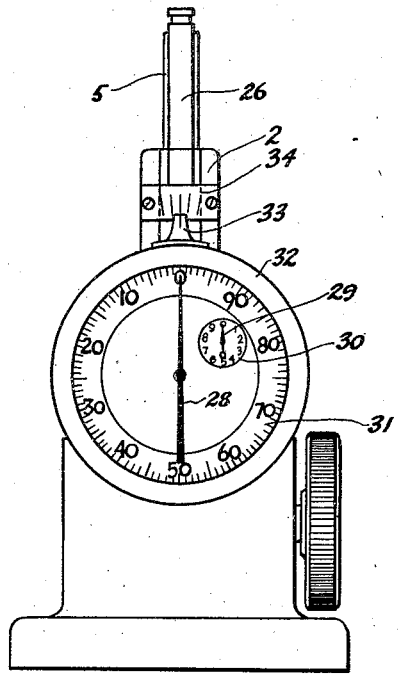
Figures 11, 12:
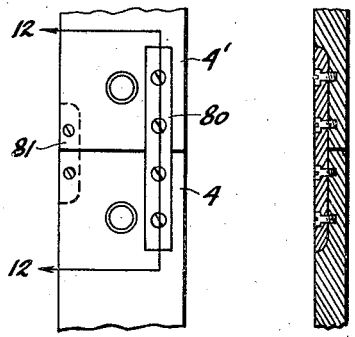
Figures 2C, 2D:
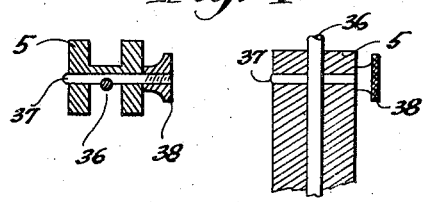
Figures 5, 7, 8, 9, 10:
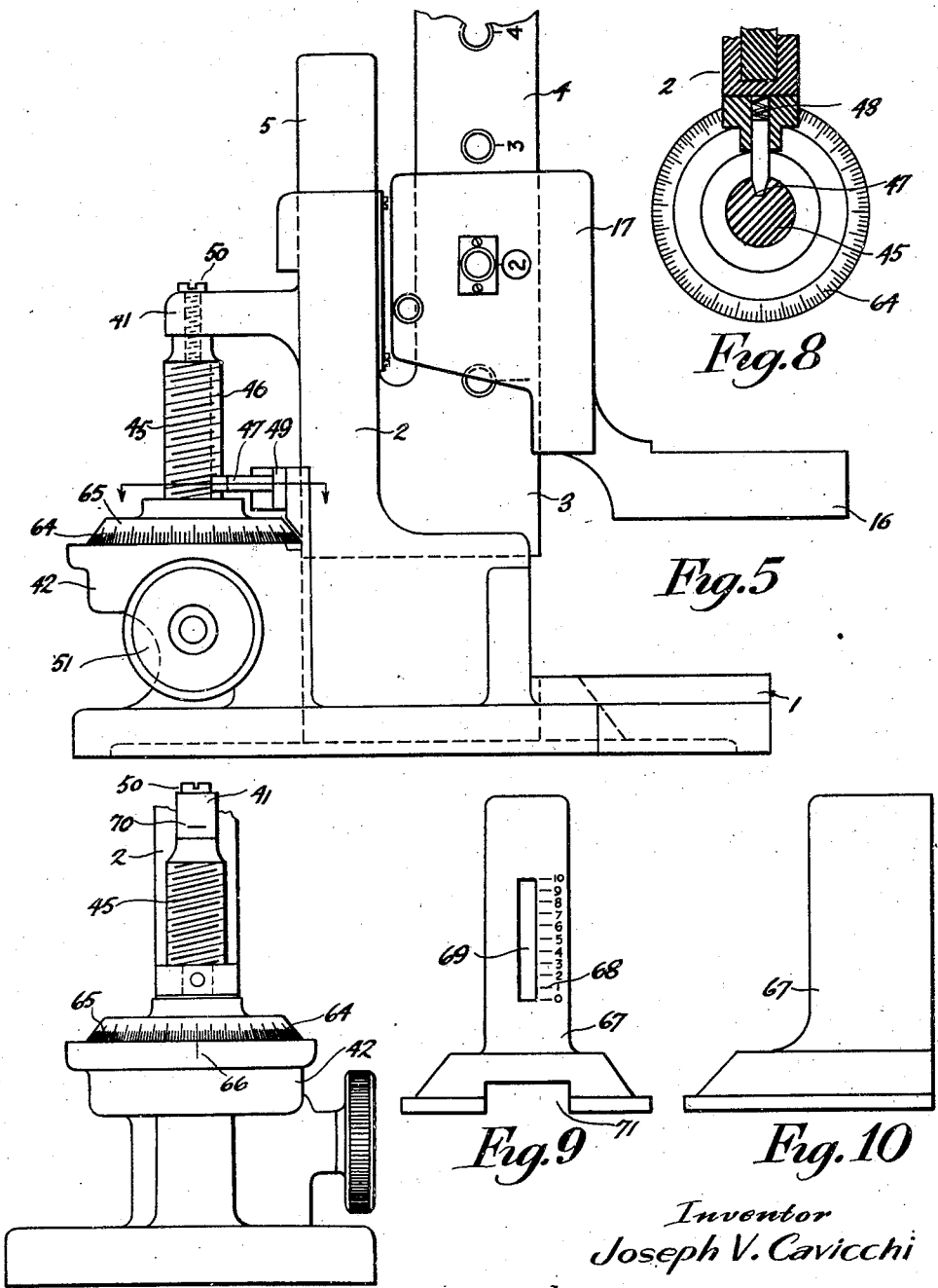

The above and other objects and features of the invention will best be understood from the following description taken in connection with the accompanying drawings in which Figure 1 shows a perspective view of a height gage according to the invention; Figure 2 shows in partial vertical section a side elevation of the gage shown in Figure 1; Figures 2a, 2b, 2c and 2d are views of details; Figure 3 is a plan view of the gage in partial section; Figure 4 is an end elevation of the same showing particularly the dial indicator and calibration adjustment for the latter; Figure 5 shows in elevation a modification of the invention employing a micrometer unit; Figure 6 is a vertical section along the line 6—6 in Figure 5; Figure 7 is a partial end elevation of the device shown in Figure 5; Figure 8 is a detail of the micrometer screw guiding device of Fig. 5; Figures 9 and 10 are respectively end and side elevations of the micrometer screw cover which carries part of the indicating scale; Figures 11 and 12 are respectively a side view and a vertical section showing an extension for the adjustable column.

As shown in Figures 1 to 4, my height gage comprises a base 1, the bottom of which has a carefully machined flat bearing surface. Mounted on the base or made integral therewith is an upright channelled supporting member 2. A vertical bar or column 3, U-shaped in elevation and having column proper 4 and guide bar 5 forming the arms of the U is slidably mounted in the channel 6 of member 2. The column member 3 is movable up and down for only slightly more than one unit of measurement, say one inch. This motion is controlled preferably by a rack and pinion mechanism, although any other suitable mechanism may be used if desired. To this end a slot is cut in the side, near the bottom of the member 3 as shown at 7 in Fig. 2. A rack 8 is mounted on one side of this slot and is engaged by a pinion gear 9 fixed to a shaft 10 which is journalled in one side of the channel 6 in supporting member 2 and in a collar or bushing 11 secured to member 2. The shaft 10 extends outwardly and has mounted on its end an operating knob 12 by the rotation of which the column is moved up and down.

The guide bar 5 is at all times pressed against the inside edge of the channel in supporting member 2 by a spring pressure plate 13 mounted on member 2 by screws 15 and shown in detail in Figs. 2a and 2b. It consists of a flat plate of steel or other spring material having a tongue 14 formed by slotting the plate and bending.

Slidably mounted on the column 4 is a measuring arm 16 having a head portion 17 through which extends a rectangular aperture shaped to fit closely over the column 4. The arm 16 may be positioned along the column at intervals spaced apart by one unit of measurement corresponding to the amount of vertical travel of the column 4 when actuated by the rack and pinion mechanism, say one inch. Accurate positioning of the arm on the column may be obtained in any desired way, but I prefer to use the method shown. This comprises a series of accurately spaced holes 18 drilled in the column 4 and having hardened, uniformly sized bushings 19 inserted therein. A corresponding hole is drilled in the sliding head 17. The hole in the latter is preferably covered by a hardened plate in which a corresponding hole is ground. The head 17 and thereby the arm 16 is held in position by a removable pin 21 which has an accurately sized slightly conical surface to fit tightly into the holes in column 4. In order further to insure accurate positioning of the arm 16, I provide additional means for tensioning the head 17 against one edge of column 4. The latter means comprises a spring pressure plate 22 mounted in a recess cut in the back inside edge of the head 17. The spring thus causes the inside front edge of head 17 to be pressed against the front edge of column 4. The spring also provides sufficient friction to keep the head and arm from dropping suddenly when pin 21 is removed. In order to permit a rigid locking of the arm 16 in position, a binding screw 23 is provided which passes through a hole in the head and is threaded into one of the side plates of the head. The binding screw is located directly behind the spring 22 so that the pressure on the latter is increased when the screw is tightened.

From what has been described thus far, it will be evident that the arm 16 may be positioned at any distance above the base 1 by selecting one of the holes 18 for the required number of whole units of measurement and by further raising or lowering the arm by adjusting the height of the column with the aid of knob 12 for the required fractions of a whole unit. The measuring distance is usually taken as the distance between the under surface of the base 1 and the under side of the arm 16.

Calibration of the measuring distance is obtained, insofar as whole units are concerned, by the holes in column 4. These holes may be marked with appropriate digits by engraving the latter directly on the column 4 as shown in Fig. 1. The marking adjacent the hole into which location pin 21 is inserted may be made visible by providing an aperture 24 in the head 17, forming a window through which the respective digits can be seen. Fractions of the unit of measurement, which represent the height to which the column 4 has been raised above the base, are indicated by an auxiliary measuring device.

In the modification shown in Figs. 1 to 4 this auxiliary device is in the form of a dial indicator 25. This indicator may be of any of the standard types such as are well known to machinists. It may, for example, comprise a cup-shaped housing containing a gear train driving a pointer around a graduated scale in response to motion of a plunger extending out of the housing. As shown, the indicator may be mounted on the base 1 adjacent the supporting member 2 with the indicator plunger 26 extending upwardly. The end of the plunger 26 is engaged by a projection 27 extending from guide bar 5 which forms part of and moves with the column 3. Thus as the adjusting knob 12 is turned raising or lowering the column 4, the plunger 26 of the indicator likewise moves in or out, thereby actuating the pointer 28. In order to obtain an accuracy of the order of one one-thousandth of an inch, it is usually necessary to provide the indicator with a second pointer 29 which makes one-tenth as many revolutions as pointer 28. The scale 30 for pointer 29 may thus be calibrated in one-hundredths of an inch while the scale 31 for pointer 28 is calibrated in one-thousandths of an inch.

The complete measurement of the height of the arm 16 above the base can thus be obtained by adding the digits adjacent the selected location of the arm on the column and the reading of the dial indicator. Moreover, the arm can quickly and accurately be set to any desired height by locating the arm on the column so that the proper number appears in the window 24 and adjusting the knob so that the indicator gives the proper fractional reading.

Fig. 4 shows an added feature of my height gage whereby any small error in the indicator as determined by calibration can at any time readily be compensated. To this end, the scale 31 of the indicator is fixed to the knurled ring 32 which is rotatable with respect to the indicator housing and carries an index 33. The scale can thus be turned independently of the pointer by a desired amount which may be indicated on another scale 34 mounted on member 2 to compensate for any error in the indicator reading. If desired, a suitable calibration chart may be mounted on the side of the instrument.

Further, for extreme accuracy, in place of the indicator one may place a gage block of known thickness between the arm 16 and the supporting table, or between the projection 27 on guide bar 5 and plate 35 mounted on top of member 2.

For a micrometer control a fine adjustment of the height of the arm is provided by a threaded stud 36 which extends upwardly from the top of member 2 and passes through holes in the upper part of guide bar 5. The stud 36 is loosely fitted into member 2 for normal operation of the height gage, but can be locked to member 2 by a threaded cylindrical pin 37 having a circular cut out portion fitting around the stud 36. The pin 37 is inserted into a hole in member 2 adjacent the pin 36. A locking nut 38 tightens the pin 37 against the stud 36 as shown in Figs. 2c and 2d. A knurled nut 39 is threaded on stud 36 in a slot cut in the upper end of guide bar 5. With the stud locked by means of pin 37 and nut 38, the height of the column and of the arm 16 can be very finely adjusted by turning the nut 39.

A height gage is frequently used to layout accurately spaced lines to be scribed on a piece of work. My height gage can be used for this purpose directly by fastening a scriber 40 to the upper side of the arm 16 as shown dotted in Fig. 1. The fastening of the scriber to the arm may be accomplished in any desired manner, for example a clamp 40'.

A modified form of auxiliary measuring device is shown in Figs. 5 to 10. This form is not only suitable for general height measuring purposes, but is also especially adapted for use as a comparator. In this form the dial indicator is dispensed with, and a micrometer device which directly controls the height of the column 4 and the arm 16 is used to provide calibrated measurement of the fractions of the units between the positions of the arm 16 along the column 4 as determined by the holes 18 and locating pin 21. This micrometer device also eliminates the rack and pinion arrangement used in the previously described modification.

In the present modification, as shown in Figs. 5 and 6, the supporting member 2, is channelled to receive guide bar 5 as before. A projection 41 forming an anvil is provided on guide bar 5, extending laterally outwards. Mounted on the base 1 or made integral therewith is a substantially cylindrical hollow housing 42. Within the housing is an internally threaded sleeve 43 rotatably mounted in ball bearings 44. Threaded into the sleeve 43 is a micrometer screw 45 having a slot 46 along its length. To keep the screw from turning when sleeve 43 is turned, a pin 47 pressed outwards by a spring 48 engages the slot 46 in the screw. The pin 47 and spring 48 are mounted in a suitable housing 49 fixed to supporting member 2. Detail of this structure is shown in Fig. 8.

The upper end of the screw 45 is fastened to the projection 41 on guide bar 5 by a screw 50. Thus as the screw is moved up and down by rotation of the sleeve 43, the column 4 and arm 16 are likewise raised and lowered.

Rotation of the sleeve 43 is controlled through a gear train operated by a knob 51 conveniently located at the side of the instrument. The knob 51 is secured to a shaft 52 journalled in a bearing plate 53 mounted on the housing 42. At the end of shaft 52 is fixed a spur gear 54 which meshes with pinion gear 55. The latter is secured to a shaft 56 also journalled in bearing plate 53. The shaft 56 carries a bevel gear 57 which meshes with bevel gear 58 on a shaft 59 journalled in a bearing plate 60 mounted at the bottom of housing 42. The gear 58 drives spur gear 58a which is mounted on the same shaft and which meshes with another gear 61 mounted on a shaft 62 which also is journalled in bearing plate 60. The shaft 62 is axially aligned with the axis of micrometer screw 45 and carries at its upper end a cup-shaped member 63 into which the sleeve 43 is tightly fitted. Thus rotation of the knob 51 rotates the sleeve 43 and thereby raises and lowers the screw 45 as explained above.

The exact amount by which the arm 16 is raised or lowered by operation of the knob 51 can be determined from a scale 64 which may be engraved on a ring 65 secured to the sleeve 43. The scale is read in conjunction with an index 66 marked on the housing 42 as shown in Fig. 7. The scale is preferably calibrated in one-thousandth of an inch and the ratio of the gear train with respect to the pitch of the thread on the micrometer screw is arranged so that the scale will make one complete revolution for one one-hundredth of an inch vertical motion of the screw 45. An additional scale 68, graduated in one-hundredth of an inch is provided on a cover 67 shown in Figures 9 and 10. The cover can conveniently be made of a molded plastic material, and the scale 68 engraved on this. The scale 68 is read in conjunction with an index marked on the projection or anvil 41 as shown at 70, which index can be seen through a window 69 cut or molded in the cover 67. The cover may be mounted on the housing 42 and may be arranged to enclose most of the scale 64, the latter being visible only through a small opening 71 in the lower rim of the cover. It will be noted that the scale 68 does not need to be especially accurate, since the exact readings are determined from the scale 64.

With either of the above described modifications of my height gage an extension may be used as shown in Figs. 11 and 12. The extension 4' is made of material shaped like that of the column 4 so as to fit on top of it. The extension 4' is keyed to the column 4 by means of keys 80 and 81 set into suitable grooves in members 4 and 4' and preferably held in place by screws as shown. Holes for properly positioning the measuring arm 16 are provided in the extension 4' as in the column proper 4. By this means the range of the gage can be doubled or even tripled without loss of accuracy.

Having now described my invention, I claim:

1. A height gage comprising a base, a channeled supporting member extending upwardly therefrom, a U-shaped vertical column supported by said member by one of the arms of said U, a measuring arm mounted on the second arm of said column and means for raising and lowering said column with respect to said base.

2. A height gage comprising a base, a channeled supporting member extending upwardly therefrom, a U-shaped vertical column supported by said member by one of the arms of said U, a measuring arm mounted on the second arm of said column, means for raising and lowering said column and measuring means operated by said column for indicating the variations in height of said arm above said base occasioned by the raising and lowering of said column.

3. A height gage comprising a base, a supporting member mounted thereon having a vertically extending channel, a U-shaped vertical column slidably supported in said channel by one of the arms of said U, a measuring arm, means selectively positioning said measuring arm on the second arm of said column at a selected one of a plurality of predetermined positions each of which is a unit of measurement from said base, means for raising and lowering said column in said channel a fractional part of said unit and means for indicating said fractional part of a unit by which said column has been raised above said base said means including that arm of said U which is supported in said channel.

4. A height gage comprising a base, a U-shaped column, a supporting member having a vertically extending channel mounted on said base and adapted to receive one arm of said column, a measuring arm mounted on the second arm of said column and micrometer screw means for raising and lowering said column in said channel and thereby said measuring arm.

5. A height gage comprising a base, a U-shaped column, a supporting member having a vertically extending channel mounted on said base and adapted to receive one arm of said column, a measuring arm mounted on the second arm of said column and micrometer screw means for raising and lowering said column in said channel and thereby said measuring arm and means for indicating the variations in height of said measuring arm above said base occasioned by the raising and lowering of said column.

6. A height gage comprising a base, a vertically channeled supporting member carried by said base, a U-shaped column slidably mounted by one arm in said channel, a measuring arm mounted on the second arm of said column, a micrometer screw for raising and lowering said column, a rotatable sleeve threaded to receive said screw, and a manually operable gear train for rotating said sleeve.

7. A height gage comprising a base, a vertically channeled supporting member carried by said base, a U-shaped column slidably mounted by one arm in said channel, a measuring arm mounted on the second arm of said column, a micrometer screw for raising and lowering said column, a rotatable sleeve threaded to receive said screw, and a manually operable gear train for rotating said sleeve and means for indicating the amount of rotation of said sleeve from a zero position.

8. A height gage comprising a base, a vertically channeled supporting member carried by said base, a U-shaped column slidably mounted by one arm in said channel, a measuring arm mounted on the second arm of said column, means for raising and lowering said column, a dial indicator mounted on said base and means on said column including said first arm thereof for actuating said indicator.

9. A height gage comprising a base, a vertically channeled supporting member carried by said base, a U-shaped column slidably mounted by one arm in said channel, a measuring arm mounted on the second arm of said column, means for raising and lowering said column and means mounted on said base and cooperating with said first arm of said column for indicating the variations in height of said arm above said base occasioned by the raising and lowering of said column.

10. A height gage including a base, a vertically channeled supporting member carried by said base, a U-shaped column slidably mounted by one arm in said channel, a measuring arm carried by the second arm of said column, a dial indicator cooperating with said first arm of said column for measuring the variations in height of said arm above said base occasioned by the raising and lowering of said column and means on said indicator and said base for varying the reading of said indicator in accordance with a calibration of the gage.

11. A height gage including a base, a vertically channeled supporting member carried by said base, a U-shaped column slidably mounted by one arm in said channel, a measuring arm carried by the second arm of said column, a shaft, means fastening one end of said shaft to said base, the other end of said shaft passing through a portion of the first arm of said column and means threaded to said shaft and cooperating with the first arm of said column for raising and lowering the column and thereby said measuring arm.

12. A height gage including a base, a channelled support thereon, a U-shaped column slidably mounted in the channel of said support and spring means frictionally pressing said column against said support.

13. A height gage including a base, a channeled support thereon, a column slidably mounted by one arm on said support in said channel and adapted to carry a measuring arm, a rack secured to said column, and a gear meshing with said rack and having its shaft journalled in said support for raising and lowering said column.

14. A height gage comprising a base, a supporting member mounted thereon, having a vertically extending channel, a U-shaped vertical column slidably supported in said channel by one of the arms of said U, a measuring arm, means selectively positioning said measuring arm on the second arm of said column at a selected one of a plurality of predetermined positions one or more whole units of measurement from said base, said means including a plurality of spaced apertures in the second arm of said column, a plurality of hardened, uniformly sized bushings in said apertures, an aperture in said measuring arm and a removable pin adapted to fit into said apertures and thereby to locate said measuring arm in said positions, and means for raising and lowering said column in said channel a fractional part of said unit.

15. A height gage comprising a base, a supporting member extending vertically upward therefrom and having a vertically extending flat-sided channel therein, a vertical column having an edge portion adapted to be engaged closely by and to slide vertically in said channel, a measuring arm mounted on said column, means for raising and lowering said column in said channel, and measuring means mounted on said base and actuated by the motion of said column for indicating the variations of height of said arm above said base occasioned by the raising and lowering of said column.

16. A height gage comprising a base, a supporting member extending vertically upward therefrom and having a vertically extending flat-sided channel therein, a vertical column having an edge portion adapted to be engaged closely by and to slide vertcially in said channel, a measuring arm, means selectively positioning said arm on said column at a selected one of a plurality of predetermined positions each of which is a unit of measurement from said base, means for raising and lowering said column in said channel a fractional part of said unit, and measuring means mounted on said base and actuated by the motion of said column for indicating said fractional part of said unit by which said column has been raised above said base.

17. A height gage comprising a base, a supporting member extending vertically upward therefrom and having a vertically extending flat-sided channel therein, a vertical column having an edge portion adapted to be engaged closely by and to slide vertically in said channel, a measuring arm mounted on said column and micrometer screw means for raising and lowering said column in said channel and means for indicating the variations in height of said measuring arm above said base occasioned by the raising and lowering of said column.

18. A height gage comprising a base, a supporting member extending vertically upward therefrom and having a vertically extending flat-sided channel therein, a vertical column having an edge portion adapted to be engaged closely by and to slide vertically in said channel, means for raising and lowering said column in said channel, means on said base providing an anvil adapted to contact one side of a gage block, means carried by said column adapted to contact the opposite side of said gage block and a measuring arm mounted on said column.

19. A height gage including a base, a supporting member extending vertically upward therefrom and having a vertically extending flat-sided channel therein, a vertical column having an edge portion adapted to be engaged by and to slide in said channel, means for raising and lowering said column in said channel and additional means for raising and lowering said column and thereby providing a fine adjustment of the height of said column said last means being disconnectible when said first means is to be used.

JOSEPH V. CAVICCHI.

REFERENCES CITED

The following references are of record in the file of this patent:

UNITED STATES PATENTS

| Number | Name | Date |
|---|---|---|
| 255,123 | Starrett | Mar. 21, 1882 |
| 477,960 | Price | June 28, 1892 |
| 2,135,316 | Whistler et al. | Nov. 1, 1938 |
| 2,252,146 | Walsh | Aug. 12, 1941 |
| 356,726 | Mossberg | Jan. 25, 1887 |
| 404,057 | Smith | May 28, 1889 |

FOREIGN PATENTS

| Number | Country | Date |
|---|---|---|
| 227,940 | Great Britain | Jan. 27, 1925 |
| 146,585 | Great Britain | July 5, 1920 |